(12) United States Patent
Easton et al.

(10) Patent No.: US 7,954,099 B2
(45) Date of Patent: May 31, 2011

(54) DEMULTIPLEXING GROUPED EVENTS INTO VIRTUAL EVENT QUEUES WHILE IN TWO LEVELS OF VIRTUALIZATION

(75) Inventors: Janet R. Easton, Woodstock, NY (US); Charles W. Gainey, Jr., Poughkeepsie, NY (US); Tan Lu, Poughkeepsie, NY (US); Ugochukwu C. Njoku, Yonkers, NY (US); Gustav E. Sittmann, III, Webster Groves, MO (US); Stephen G. Wilkins, Endwell, NY (US); Frank W. Brice, Jr., Hurley, NY (US); Damian L. Osisek, Vestal, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 1412 days.

(21) Appl. No.: 11/436,012

(22) Filed: May 17, 2006

(65) Prior Publication Data

US 2007/0271559 A1 Nov. 22, 2007

(51) Int. Cl.
*G06F 9/455* (2006.01)
(52) U.S. Cl. .......................................................... 718/1
(58) Field of Classification Search .................. 718/1
See application file for complete search history.

(56) References Cited

U.S. PATENT DOCUMENTS

| | | | |
|---|---|---|---|
| 6,748,460 B2 | 6/2004 | Brice, Jr. et al. | 710/5 |
| 6,754,738 B2 | 6/2004 | Birce, Jr. et al. | 710/48 |
| 6,880,021 B2 | 4/2005 | Easton et al. | 710/5 |
| 6,944,847 B2 | 9/2005 | Desai et al. | 717/121 |
| 2001/0049741 A1 | 12/2001 | Skene et al. | 709/232 |
| 2002/0173863 A1 | 11/2002 | Imada et al. | 700/83 |
| 2003/0065856 A1* | 4/2003 | Kagan et al. | 710/263 |
| 2003/0126265 A1* | 7/2003 | Aziz et al. | 709/227 |
| 2003/0133449 A1 | 7/2003 | Fitzpatrick et al. | 370/389 |
| 2003/0154236 A1 | 8/2003 | Dar et al. | 709/310 |
| 2004/0143664 A1 | 7/2004 | Usa et al. | 709/310 |
| 2004/0153614 A1 | 8/2004 | Bitner et al. | 711/310 |
| 2004/0230712 A1* | 11/2004 | Belmar et al. | 710/15 |
| 2004/0250254 A1 | 12/2004 | Frank et al. | 719/310 |
| 2005/0044301 A1 | 2/2005 | Vasilevsky et al. | 711/1 |
| 2005/0108718 A1* | 5/2005 | Kumar et al. | 718/102 |

OTHER PUBLICATIONS

InfiniBand Architecture Specification Volume 1, Release 1.0.a (2001) Chapter 3: Architectural Overview, pp. 61-114, Chapter 17: Channel Adapters, pp. 822-845.
Rogers et al., ABCs of z/OS system Porgramming vol. 10, IBM Redbook, sg4-2990-00(Jun. 2004) Chapter 4: Logical partition (LPAR) concepts, pp. 193-226.

* cited by examiner

*Primary Examiner* — Meng-Ai An
*Assistant Examiner* — Brian Chew
(74) *Attorney, Agent, or Firm* — Cantor Colburn LLP; Steven Chiu

(57) ABSTRACT

A method, system, program product and computer data structure for providing for two levels of server virtualization. A first hypervisor enables multiple logical partitions to share a set of resources and provides a first level of virtualization. A second hypervisor enables multiple, independent virtual machines to share the resources that are assigned to a single logical partition and provides a second level of virtualization. All events for all of the virtual machines within said single logical partition are grouped into a single partition-owned event queue for receiving event notifications from the shared resources for that single logical partition. A request for an interrupt is signaled for the grouped events from the partition-owned event queue for the demultiplexing of grouped events, by the machine, from the partition-owned event queue into individual, virtualized event queues that are allocated on a per virtual machine basis.

20 Claims, 14 Drawing Sheets

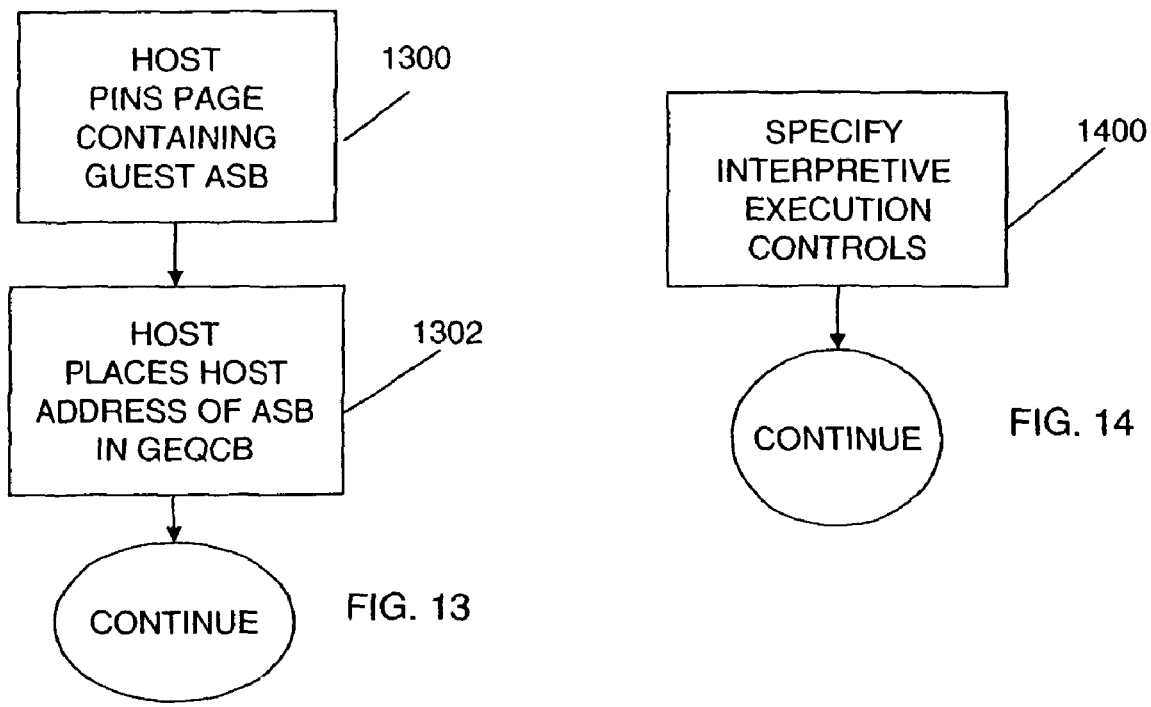
FIG. 13
FIG. 14
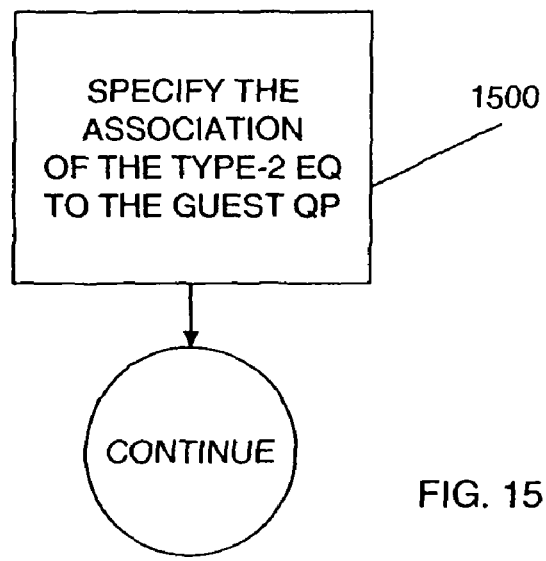
FIG. 15

DEMULTIPLEXING GROUPED EVENTS INTO VIRTUAL EVENT QUEUES WHILE IN TWO LEVELS OF VIRTUALIZATION

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety:
U.S. patent application Ser. No. 11/100,845 for IMPROVED SYSTEM AND METHOD FOR PRESENTING INTERRUPTS, filed Apr. 7, 2005 by Thomas A. Gregg et al.

FIELD OF THE INVENTION

This invention relates to signaling a request for an interrupt in a logically partitioned data processing system, and particularly relates to adding a second virtualized event-notification level for signaling a request for an interrupt to a virtual machine or guest running in a logical partition within a logically partitioned data processing system.

BACKGROUND OF THE INVENTION

InfiniBand specifications describe the concepts of work queue pairs (QPs) and completion queues (CQs). To enhance scalability to a large number of logical partition and virtual machine resources, event queues (EQs) are added which are used by the Host Channel Adapter (HCA) to record a summation of events associated with QP and CQ resources. FIG. 1 illustrates a prior art InfiniBand system 10 having multiple processor nodes 100 interconnected through a fabric network 102 to, for instance, a Storage Subsystem 104, a RAID Subsystem 106, Consoles 108, and multiple I/O Chassis 110 through which are connected SCSI devices, Ethernet connections, Fibre Channel (FC) Hub and FC devices, Graphics and Video devices. The Fabric 102 includes multiple switches 112 and Routers 114 such that messages and data may be exchanged over the InfiniBand system 10. Each Processor Node 100 includes one or more Central Processor Units (CPU) 116, a memory 118, and a Host Channel Adapter (HCA) 120. The InfiniBand System 10 and the HCA 120 are well known and fully explained in the InfiniBand Architecture Specification by the InfiniBand Trade Association, Release 1.0.a, (2001).

Logical Partition (LPAR) concepts are discussed in Rogers et al., ABCs OF z/OS SYSTEM PROGRAMMING VOLUME 10, IBM Redbook, SG24-6990-00 (June 2004).

U.S. Pat. No. 6,944,847 B2 issued Sep. 13, 2005 to Desai et al. for VIRTUALIZATION OF INPUT/OUTPUT DEVICES IN A LOGICALLY PARTITIONED DATA PROCESSING SYSTEM discloses a hypervisor layer which synchronizes use of virtualized input/output devices that may regularly be used by multiple partitions of a logically partitioned data processing system by making them callable by any system partition to the hypervisor layer.

U.S. Pat. No. 6,748,460 B2 issued Jun. 8, 2004 to Brice, Jr. et al. for INITIATIVE PASSING IN AN I/O OPERATION WITHOUT THE OVERHEAD OF AN INTERRUPT discloses passing initiative to a processor for handling an I/O request for an I/O operation for sending data between a main storage and one or more devices.

U.S. Pat. No. 6,754,738 B2 issued Jun. 22, 2004 to Brice, Jr. et al. for LOW OVERHEAD I/O INTERRUPT discloses sending data to or receiving data from one or more I/O devices in an I/O operation with a main storage controlled by a processor in a data processing system.

U.S. Pat. No. 6,889,021 B2 issued Apr. 12, 2005 to Easton et al. for INTELLIGENT INTERRUPT WITH HYPERVISOR COLLABORATION discloses controlling the transfer of data in a data processing system having a processor handling an I/O request in a I/O operation, main storage controlled by the processor for storing data, and one or more I/O devices for sending data to or receiving data from the main storage.

U.S. Patent Application Publication US 2001/0049741 A1 published Dec. 6, 2001 by Skene et al. for METHOD AND SYSTEM FOR BALANCING LOAD DISTRIBUTION ON A WIDE AREA NETWORK discloses a system and method for balancing the load on virtual servers managed by server array controllers at separate data centers that are geographically distributed on a wide area network such as the internet.

U.S. Patent Application Publication US 2002/0173863 A1 published Nov. 21, 2002 by Imada et al. for VIRTUAL MACHINE SYSTEM AND VIRTUAL MACHINE CONTROL METHOD discloses a user interface function for a virtual machine system based on a server or a PC by applying software without using service processor or the like.

U.S. Patent Application Publication US 2003/0126265 A1 published Jul. 3, 2003 by Aziz et. al. for REQUEST QUEUE MANAGEMENT discloses method and apparatus for managing a dynamically sized, highly scalable and available server farm.

U.S. Patent Application Publication 2003/0133449 A1 published Jul. 17, 2003 by Fitzpatrick et al. for FAST PATH ROUTING IN A LARGE-SCALE VIRTUAL SERVER COMPUTING ENVIRONMENT discloses methods, systems, and computer program products for improving data transfer in complex computing environments. Internal routing enhancements are defined which enable traffic of virtual servers to be processed more efficiently, thereby improving overall data transfer rates.

U.S. Patent Application Publication US 2003/0154236 A1 published Aug. 14, 2003 by Dar et al. for DATABASE SWITCH ENABLING A DATABASE AREA NETWORK discloses a method and system for improving utilization of the typical DBMS client-server configuration and includes a Database Switch situated between the application and database servers in a network capable of dynamically and transparently connecting applications to databases using standard database servers and standard protocols.

U.S. Patent Application Publication US 2004/0143664 A1 published Jul. 22, 2004 by Usa et al. for METHOD FOR ALLOCATING COMPUTER RESOURCE discloses dynamically reallocating a computer resource to a plurality of virtual machine LPARs with optimum quantities of resource allocation being determined so that the virtual machine LPARs will hardly have resource shortages in the near future.

U.S. Patent Application Publication US 2004/0153614 A1 published Aug. 5, 2004 by Bitner et al. for TAPE STORAGE EMULATION FOR OPEN SYSTEMS ENVIRONMENTS discloses a virtual tape server residing on a network connectible on its front end to a plurality of heterogeneous backups hosts with different operating systems and/or backup applications, and on its back end to one or more disk storage devices in an open systems environment.

U.S. Patent Application Publication US 2004/0250254 A1 published Dec. 9, 2004 by Frank et al. for VIRTUAL PROCESSOR METHODS AND APPARATUS WITH UNIFIED EVENT NOTIFICATION AND CONSUMER-PRODUCER MEMORY OPERATIONS discloses a virtual processor that includes one or more virtual processing units which execute on one or more processors, with each virtual processing unit executing one or more processes or threads.

U.S. Patent Application Publication US 2005/0044301 A1 published Feb. 24, 2005 by Vasilevsky et al. for METHOD AND APPARATUS FOR PROVIDING VIRTUAL COMPUTING SERVICES discloses a level of abstraction created between a set of physical processors and a set of virtual multiprocessors to form a virtualized data center.

U.S. Patent Application Publication US 2004/0230712 published Nov. 18, 2004 by Belmar et al. for MANAGING INPUT/OUTPUT INTERRUPTIONS IN NON-DEDICATED INTERRUPTION HARDWARE ENVIRONMENTS discloses input/output interruptions managed in computing environments that do not use dedicated per-guest interruption hardware to present interruptions. Dispatchable guest programs in the environment receive I/O interruptions directly without hypervisor intervention.

Returning to FIG. 1, in the HCA 120 for use with the InfiniBand system which is provided by IBM, events that are recorded in EQs are classified as either completion events or non-completion events. Completion Events include when a program-initiated work request, as identified by a work-queue entry (WQE) in a QP, is completed by the HCA. A completion event may be recognized and completion-queue entry (CQE) is recorded in the CQ associated with the QP. If the EQ associated with the CQ does not already contain a pending EQE for a completion event, an EQE for a completion event is made pending in the EQ. Non-Completion Events include when errors associated with an HCA resource occur or the status or configuration of an HCA resource changes. A non-completion may be recognized, and if the EQ associated with the resource does not already contain a pending EQE for the type of non-completion event that was recognized, an EQE for that type of non-completion event is made pending in the EQ.

For an HCA, an operating system of the Processor Nodes 100 allocates one or more QPs and CQs, allocates a single EQ, and associates the QPs and CQs with that EQ. This forms a hierarchy in which the QPs and CQs are at the bottom and the single EQ (and its associated I/O interrupts) is at the top. Thus, completion and non-completion events for a single HCA may be mapped into a single EQ for each operating system.

This hierarchical design allows an operating system to efficiently demultiplex HCA events back to the individual QPs and CQs as required. Other IBM patents describe how to virtualize a given physical HCA to support multiple, separate logical partitions (within a single central-processing complex (PC)) concurrently by having each of the partitions own and manage its own separate QPs, CQs, and EQ. In this case, the HCA hardware performs a form of multiplexing by vectoring HCA events into the EQ of the partition which owns the resource (i.e., QP or CQ) for which the event is recognized.

SUMMARY OF THE INVENTION

The problem being solved is that a platform such as the IBM zSeries platform provides two levels of server virtualization. The first level is provided by the LPAR hypervisor enabling multiple logical partitions to share HCA resources. The second level is provided by a virtual machine hypervisor such as the z/VM hypervisor enabling multiple, independent virtual machines to share the HCA resources that are assigned to a single logical partition. This environment has high scaling demands in that it must support the sharing of HCA resources between hundreds to thousands of virtual machines that are concurrently executing within each of multiple logical partitions This invention solves such scalability requirements. This invention is a collaboration of HCA hardware and firmware, zSeries platform firmware, and the z/VM hypervisor that provides the appearance that each of the potential thousands of operating systems, executing in logical partitions and virtual machines, owns its own separate EQ(s) to receive HCA event notifications from the shared HCA hardware. This is implemented by adding a second, virtualized EQ level above the EQ level described in the background section.

Specifically, the HCA hardware groups all events for all of the virtual machines within a single logical partition into a "single" partition-owned EQ and then signals a request for an interrupt, which causes the zSeries firmware to get control. The firmware, with help from the z/VM hypervisor, demultiplexes the grouped events from the partition-owned EQ into the individual, virtualized EQs that are allocated on a per virtual machine basis and generates associated virtual machine EQ entries and associated interrupts appropriately. Neither the virtual machine nor the HCA are aware of this additional level of EQ virtualization.

It is an object of the present invention to provide the zSeries platform with a significant competitive advantage by providing a cost-effective, yet extremely efficient mechanism for sharing HCA resources across thousands of consuming server images.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 10 through 15, when taken together, form a flow-chart of functions performed by the host for resource allocation and structure initialization.

Figure 1:
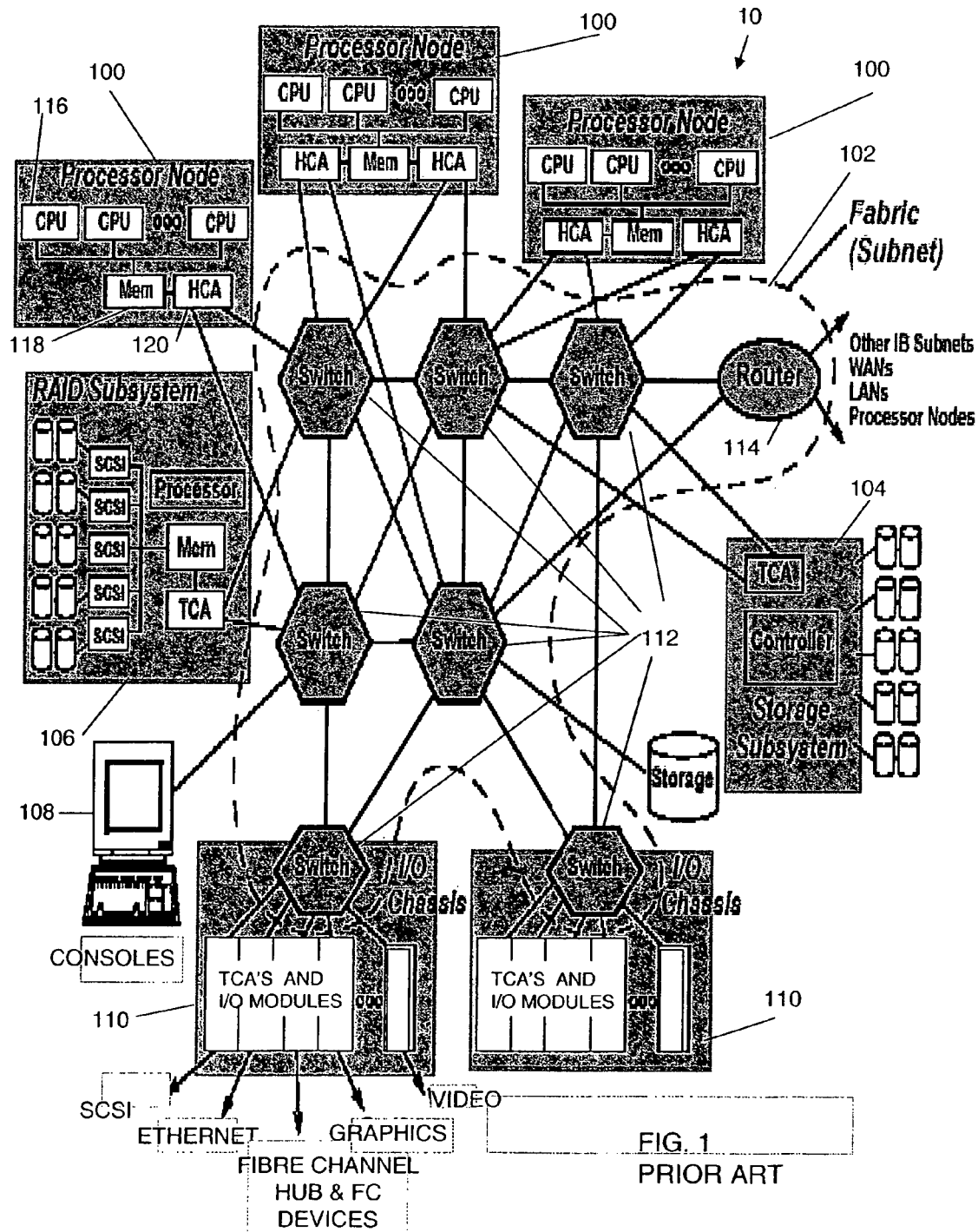
FIG. 1 is an illustration of a prior art InfiniBand system usable with the present invention and which includes processor nodes each having a Host Channel Adapter (HCA)

The detailed description explains the preferred embodiments of the invention, together with advantages and features, by way of example with reference to the drawings.

DETAILED DESCRIPTION OF THE INVENTION

As used herein, the term "guest" is used to refer to a pageable virtual machine and the term "host" is used to refer to a hypervisor program that implements the guest using interpretive execution. An example of such a hypervisor is IBM z/VM available from International Business Machines Corporation of Armonk, N.Y. It will be understood that other implementations of facilities similar to interpretive execution may be used for the implementation of hosts and guests. The terms "virtual machine" and "guest" may be used interchangeably herein.

As used herein, the term "pinning" is used to mean that a host page that is normally pageable is made non-pageable by the host.

As used herein, "the machine" is used to mean the CPU as viewed by a program. The machine, then, includes both the CPU hardware plus any firmware implementation.

As used herein, the following definitions are provided:

HCA resources, such as QPs, CQs, and EQs are allocated using an appropriate ALLOCATE instruction.

The allocate instruction is virtualized such that when issued by a guest it is intercepted and the host intermediates the resource allocation with the HCA.

The controls for HCA QP, CQ, and EQ resources reside in adapter storage and are accessible by appropriate LOAD and STORE instructions.

The STORE and LOAD instructions are virtualized such that when issued by a guest they may be intercepted and processed by the host or may be interpretively executed by the guest with no interception.

When HCA resources are configured, the following may be true:

A QP may be associated with a maximum of two CQs, one for completed send requests and one for completed receive requests. Or, a QP may be associated with a single CQ for both completed send and completed receive requests.

More than one QP may be associated with a single CQ.

A QP may be associated with a single EQ. Non-completion events associated with the QP are recorded in the EQ.

More than one QP may be associated with a single EQ.

A CQ may be associated with only one EQ. Completion events associated with the CQ and its associated QP(s) are recorded in the EQ.

More than one CQ may be associated with a single EQ.

An adapter-summary byte (ASB) may be associated with an EQ. (An ASB is a byte in program storage that the program typically initializes to zero. When an EQE is added to the EQ that is associated with an ASB, the adapter sets the value of the ASB to a non-zero value.)

A primary-summary byte (PSB) may be associated with an EQ. (A PSB is a byte in the hardware storage area (HSA) that the machine typically initializes to zero. When an EQE is added to the EQ that is associated with the PSB, the adapter sets the value of the PSB to a non-zero value.) The PSB is visible only to the machine firmware.

More than one EQ may be associated with a single ASB.

More than one EQ may be associated with a single PSB.

An adapter interruption is an I/O class interruption that is not associated with any subchannel. An adapter interruption is associated with an interruption zone (IZone) and an interruption subclass (ISC). The IZone identifies which logical partition is to receive the interruption. The ISC defines interruption priority, within the partition or virtual machine, and also allows the interruption to be maskable.

Figure 2:
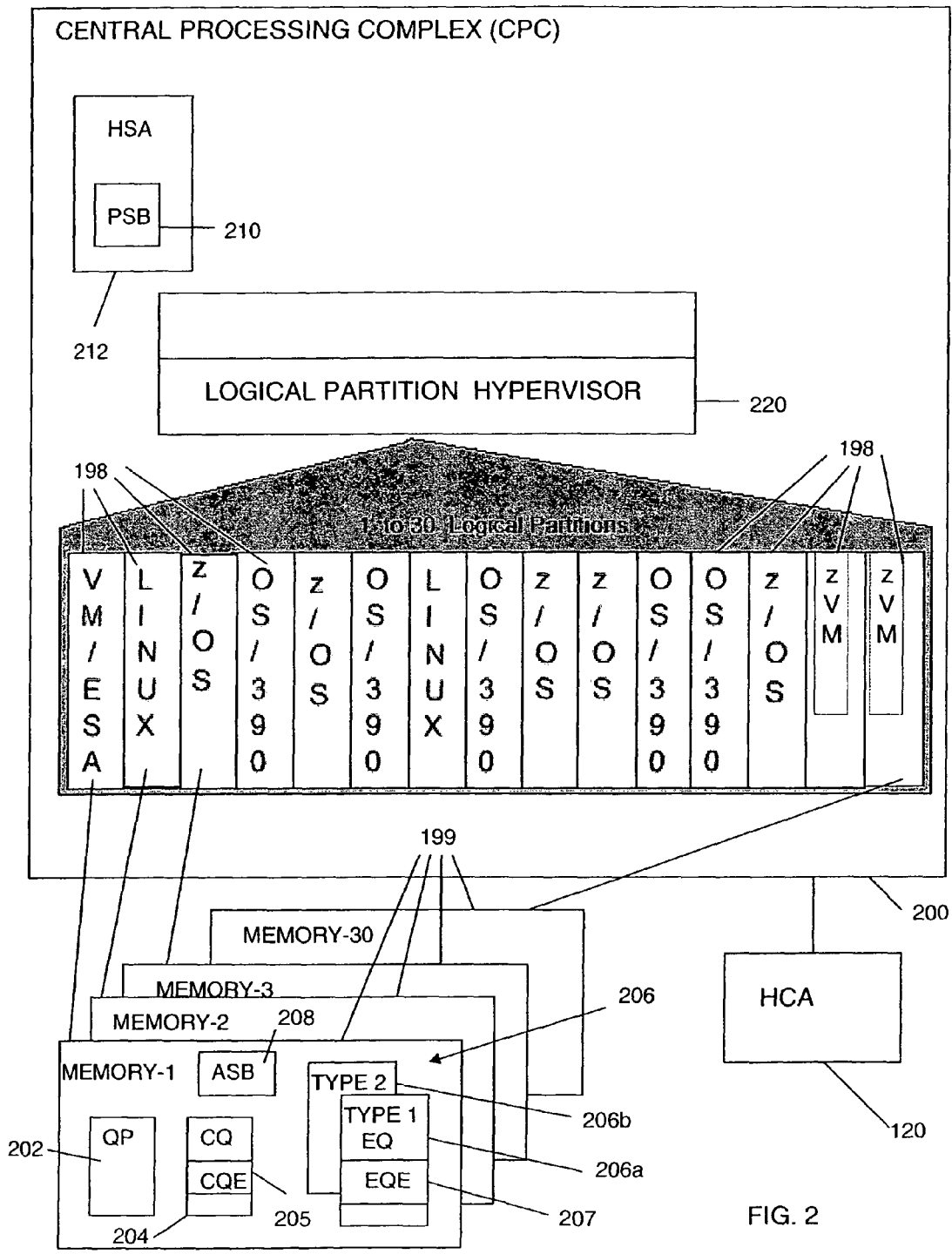
FIG. 2 is an illustration of a Central Processor Complex (CPC) of one of the processor nodes of FIG. 1 and includes a representation of main memory having a Logical Partition (LPAR) Hypervisor layer which provides a first level of virtualization, and includes logical partitions and data structures in the memories of the logical partitions.

FIG. 2 is an illustration of a Central Processor Complex (CPC) 200 of one of the processor nodes 100 of FIG. 1. The CPC 200 includes the memory 118 and at least one of the CPUs 116 of FIG. 1. The CPC 200 is connected to the HCA 120. The CPC 200 includes a logical partition hypervisor 220 which as is well known, divides the memory into multiple logical partitions 198. Each logical partition 198 has a memory 199 that is part of memory 118. Each memory 199 for the logical partition 198 includes Queue Pairs (QP) 202, Completion Queues (CQ) 204, and Event Queues (EQ) 206. It will be understood that the CQ 204 includes Completion Queue Entries (COE) 205, and EQ 206 includes Event Queue Events (EQE) 207 wherein each completion and event is recorded, as will be discussed. The EQ 206 is made up of a TYPE 1 EQ 206a and a TYPE 2 EQ 206b. The QP 202 controls I/O requests, one queue for send requests, and one queue for receive requests. The CQ 204 is for recording I/O completion status. The EQ 206 records event notifications including completion and non-completion of events. Also in each logical partition memory 199 is an Adapter-Summary Byte (ASB) 208, also known as a Secondary Summary Byte (SSB) which may be associated with an EQ 206a. A Primary-Summary Byte (PSB) 210 in included in the memory 118, which may be associated with an EQ 206b. The PSB 210 may be kept in that part of the memory known as the Hardware Storage Area (HSA) 212 which is a restricted part of memory 118 and is not available to applications running on the processor but is for machine firmware.

As mentioned, one layer in the CPC 200 is a Logical Partition Hypervisor 220, referred to as the LPAR Hypervisor, which is the control program that, along with the underlying firmware, manages LPARS 198 in the CPC 200. For example, in the LPAR Hypervisor for the zSeries z990 platform, the CPC 200 may have from one to thirty logical partitions, which each partition having its own operating system, as shown in FIG. 2. This is the first level of virtualization.

Figure 3:
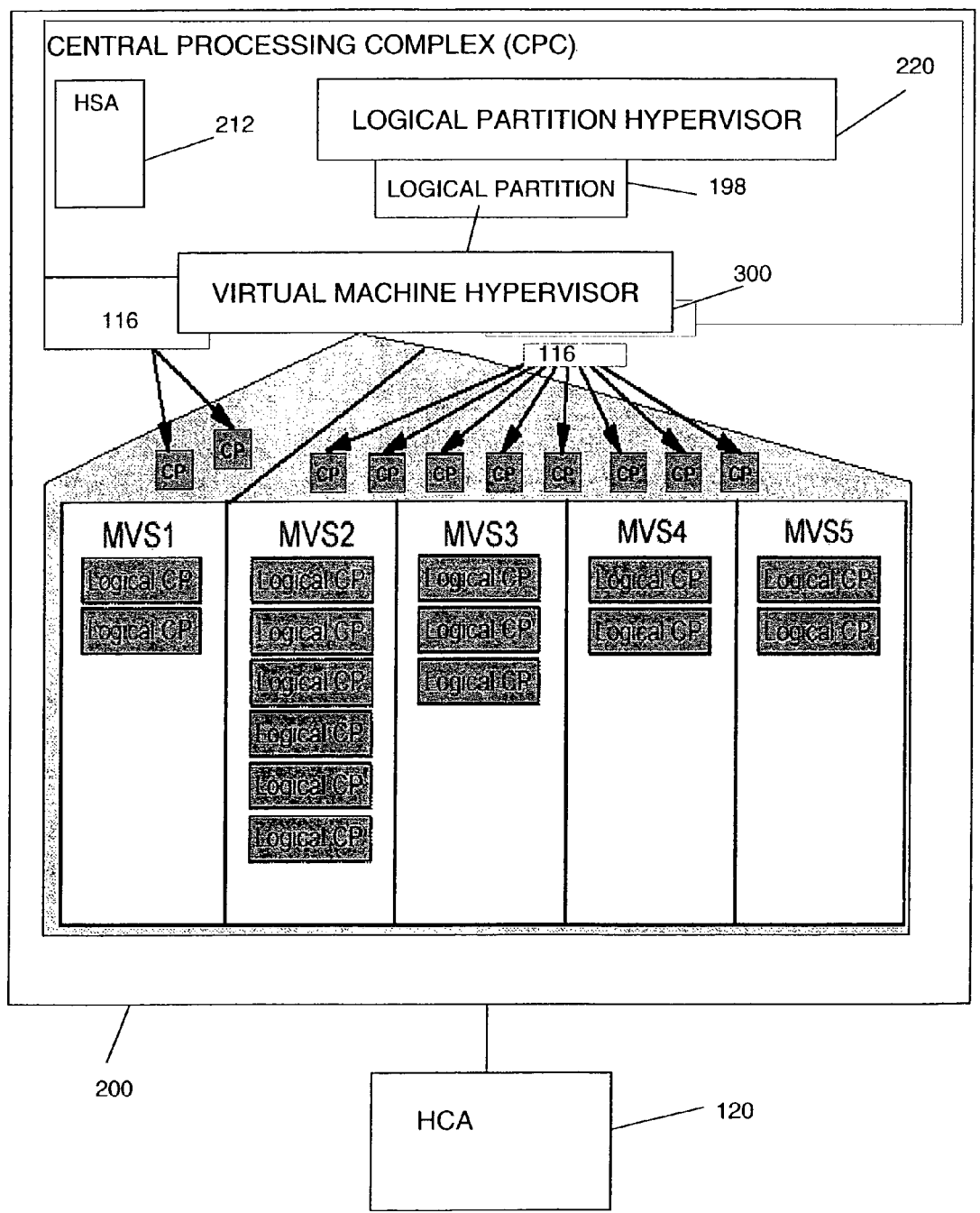
FIG. 3 is a further illustration of the CPC of FIG. 2 and includes a Virtual Machine (VM) Hypervisor layer managing resources within a single partition of FIG. 2 and which provides a second level of virtualization.

FIG. 3 is an illustration of an additional layer of the CPC 200 in which a virtual machine hypervisor layer 300 shares the resources assigned to its logical partition, such as physical central processor units or central processors (CP) 116 and memory 118 between virtual machines. The virtual machine hypervisor manages the resources within a single partition 198. The CPs 116 and memory 118 shown are only those assigned to the partition in which the virtual machine hypervisor 300 is running. FIG. 3 illustrates a processor having a plurality of processors 116 assigned to the logical partition in which a virtual machine hypervisor is executing. In this example, two of the partition's processors 116 are uniquely assigned by the VM hypervisor to the virtual machine identified as MVS1 and eight of the processors 116 are shared between the virtual machines identified as MVS2 through MVS5. In FIG. 3, the Virtual Machine Hypervisor 300 may be, for example a z/VM Hypervisor. Likewise, HCA resources assigned to a single logical partition may be shared among the multiple, independent virtual machines managed by a virtual machine hypervisor executing in that logical partition. This is the second level of virtualization.

To alleviate the overhead associated with EQ polling, a mechanism is utilized wherein the HCA 120 can signal a request for an I/O-class interruption, termed an adapter interruption. Such interruptions may be requested when an EQ 206 transits from the empty state to the non-empty state. An adapter interruption provides the initiative to the program to process all completion events (recorded in associated CQEs 205 of CQ 204) and/or non-completion events recorded in the EQ 206.

The program will continue to process recorded events until they are exhausted and the program places the EQ 206 back to the empty state. Note that while the EQ 206 is in the non-empty state, the program is assumed to have initiative. While the program has initiative the program is expected to recognize the arrival of any new EQEs 207 in EQ 206. Thus, the adapter may recognize new event completions and add new EQEs 207 while suppressing the generation of new adapter interruptions.

Summary indicators ASB 208 and PSB 210 may also be associated with an EQ 206 or group of EQs to facilitate the program and machine with recognizing which EQs need to be processed. Whenever the HCA records an EQE 207 in an EQ 206 that is associated with a summary indicator ASB 208 or PSB 210, the indicator is set to a non-zero value. When the program takes the initiative to begin consuming EQEs 207, it first sets the summary indicator ASB 208 to the value of zero so that initiative is not lost.

By utilizing the HCA resource hierarchy, including the additional virtualized EQ 206 level as discussed, EQEs 207 for guest completion events are recorded directly in the EQ 206 owned by the guest that owns the event, a very efficient delivery of EQEs 207 across a large number of guests is provided. This involves cooperation between the HCA 120, the zSeries firmware, and the z/VM hypervisor 300.

The virtual machine hypervisor 300 allocates two EQs 206 per HCA 120 for the logical partition in which it is executing. The first (or TYPE-1) EQ 206a is for the recording of normal (i.e., completion) events for guests, and the second (or TYPE-2) EQ 206b is for the recording of exception (i.e., non-completion events) for guests. The virtual machine hypervisor 300 also associates a unique ASB 208 with each TYPE-2 EQ 206b. All guest EQs 206 allocated for an HCA 120 are associated with the TYPE-1 EQ 206a for that HCA through a set of control blocks, one control block set per guest EQ 206, that are initialized by the z/VM hypervisor 300.

When TYPE-1 EQs 206a are allocated, the firmware ensures that a unique PSB 210 is associated with each of the TYPE-1 EQs 206a for the logical partition. When TYPE-2 EQs 206b are allocated, the firmware ensures that a single PSB 210 is associated with all of the TYPE-2 EQs 206b for the logical partition.

When an EQE 207 is recorded in a TYPE-1 EQ 206a, the HCA 120 sets the PSB 210 associated with the TYPE-1 EQs 206a to all non-zero values and signals a request for adapter interruption. The firmware's response to the adapter interruption request is to forward the EQE 207 to the EQ 206 of the guest owning the event and, based on the guest's EQ 206 and interruption controls, to set the guest ASB 208 and present an adapter interruption to the guest. The firmware uses the PSBs 210 to identify which TYPE-1 EQs 206a contain EQEs 207 that need to be forwarded and uses information in those EQEs 207 to identify to which guest EQ 206 the forward should occur. The firmware also uses control blocks in the virtual machine hypervisor memory that associate the guest EQ 206 with the host TYPE-1 EQ 206a to determine the location of the guest EQ 206. The firmware also uses z/VM control blocks to make a guest adapter interruption pending.

When an EQE 207 is recorded in a TYPE-2 EQ 206b, the HCA 120 sets the PSB 210 associated with all TYPE-2 EQs 206b to all non-zero values, sets the unique ASB 208 associated with the TYPE-2 EQ 206b to a non-zero value, and signals a request for adapter interruption. The firmware's response to the adapter interruption request is to generate an adapter interruption for the partition which drives the z/VM hypervisor 300 to handle the event (which may include generating an EQE 207 in the EQ 206 of the guest owning the event and setting the guest ASB and making a guest adapter interruption pending). The virtual machine hypervisor 300 uses the ASBs 208 to identify which TYPE-2 EQs 206b contain EQEs 207 that need to be forwarded.

QDIO adapter interruptions for HCAs scale very efficiently in both LPAR and pageable virtual machine (z/VM) environments. QDIO adapters by IBM are well understood and will not be discussed further. Adapter interruptions associated with HCA resources owned by a logical partition can be routed directly to that logical partition, without LPAR hypervisor 220 intervention. Similarly, adapter interruptions associated with HCA resources owned by a guest can be routed directly to that virtual machine, without LPAR hypervisor 220 and virtual machine hypervisor 300 intervention. Presentation of the interruption to the guest, rather than queuing, is a function of whether the guest is running.

Figure 4:
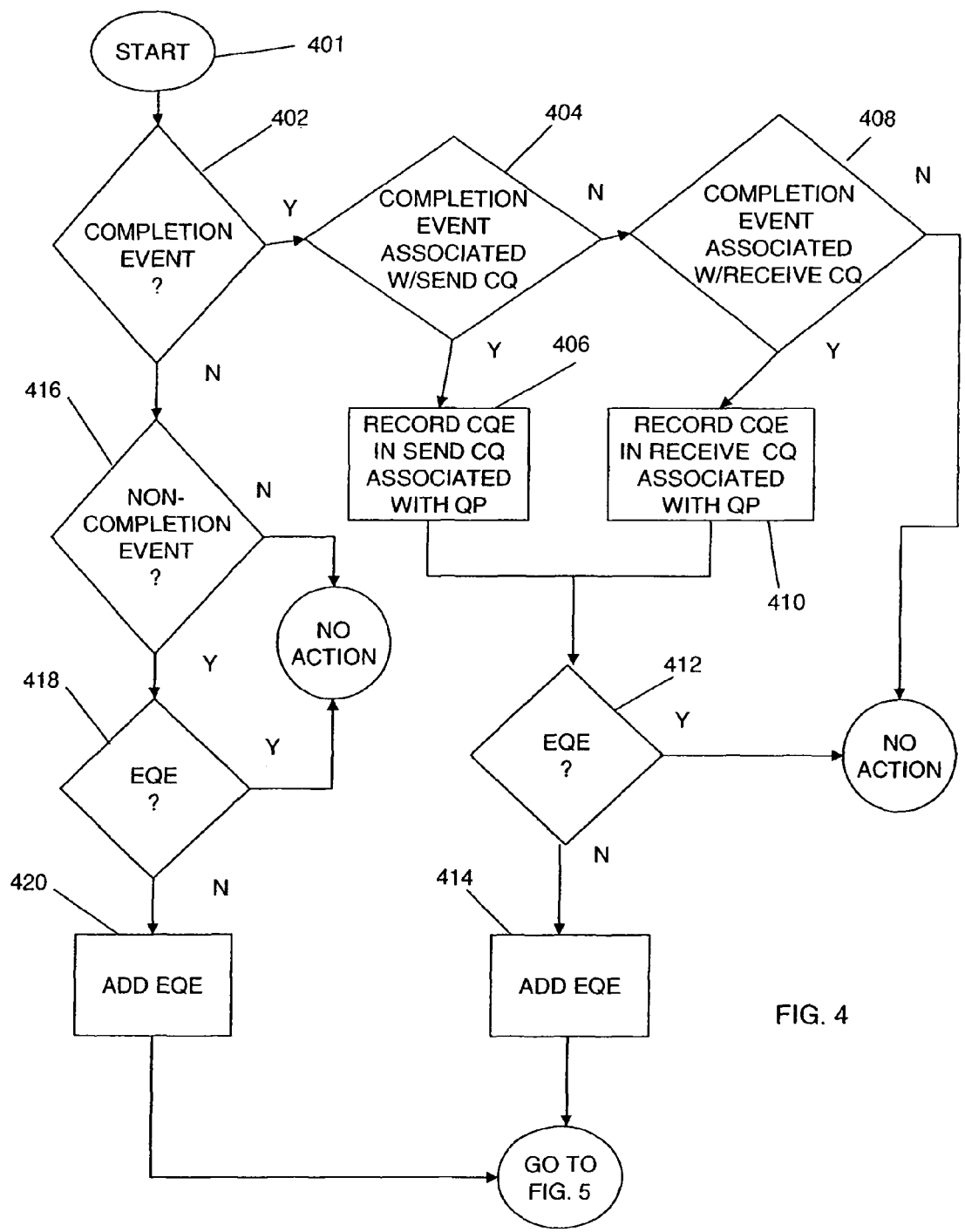
FIGS. 4, 5 and 6, when taken together, form a flowchart for Host Channel Adapter interruptions for logical partitions.
Figure 5:
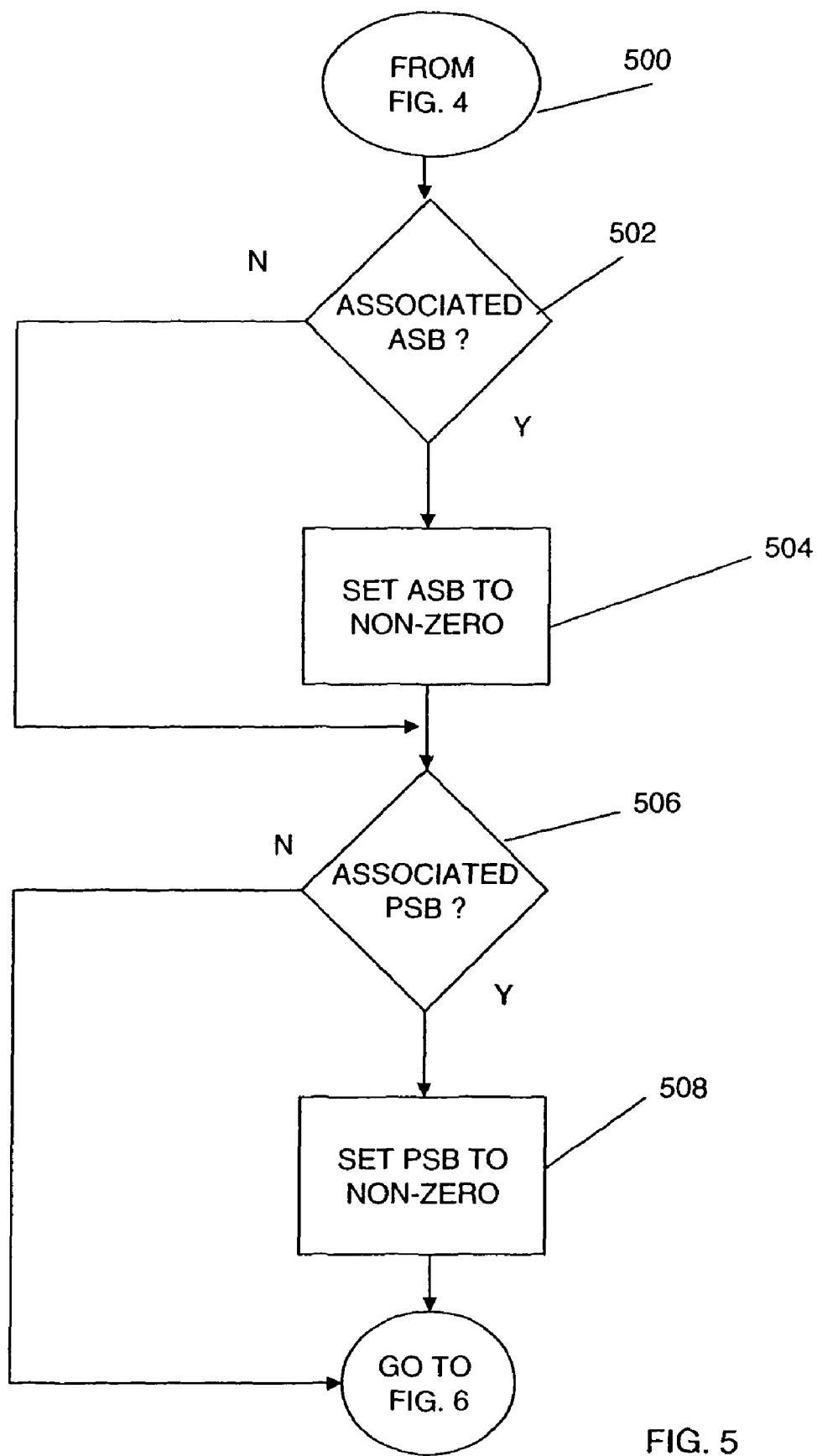
Figure 6:
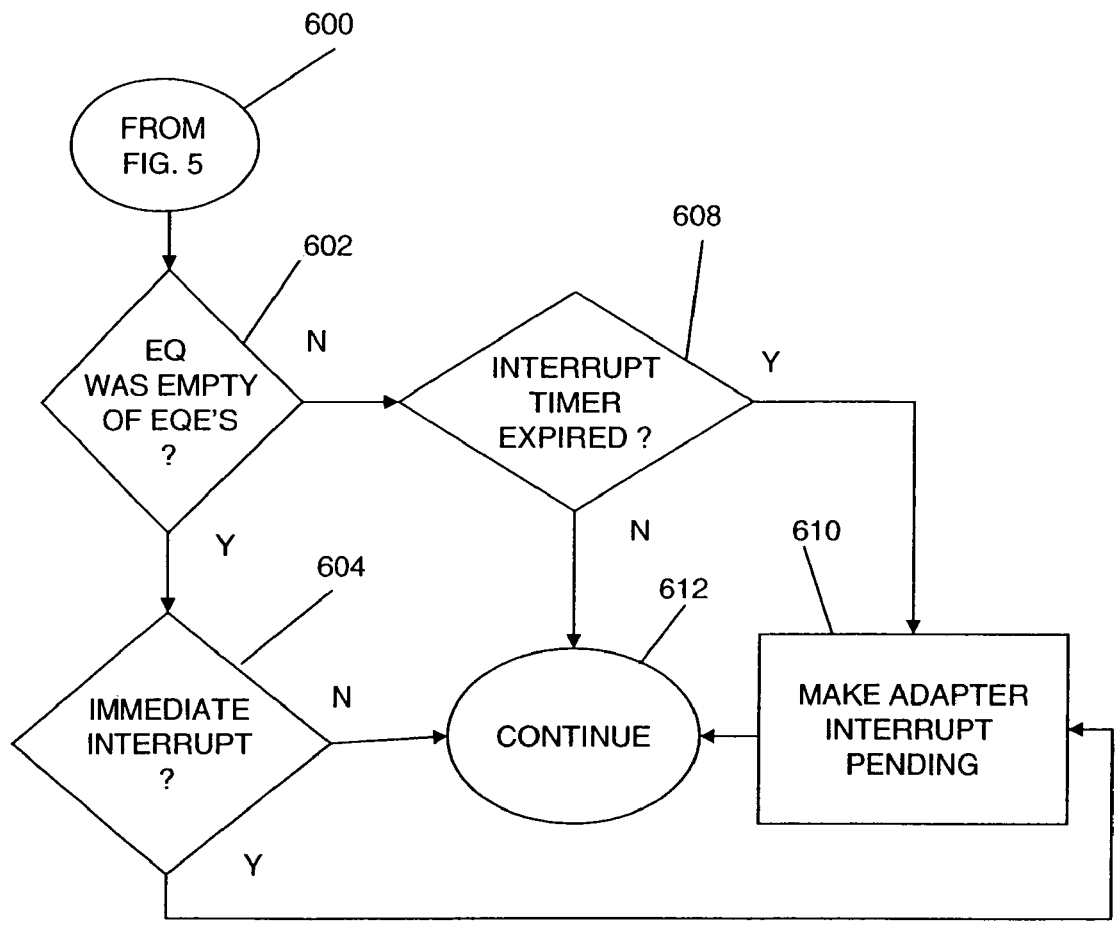

InfiniBand Host Channel Adapter Interruptions for Logical Partitions are illustrated in FIGS. 4, 5 and 6, which, when taken together, form a flowchart for Host channel adapter interruptions for logical partitions which are best understood in the context of the sequence of events comprising HCA event notification. Starting in FIG. 4, at 401, the Adapter-Event Description Recordings function starts. At 402, a check is made for a completion event. When a completion event is recognized by an HCA at 402, a check is made at 404 to check if the completion event is associated with the send CQ, and a check is made at 408 to determine if the completion event is associated with the receive CQ. A CQE is recorded in CQ associated with the QP containing the work request (406 for send CQ and 410 for receive CQ). A check is made at 412 to determine if the EQ associated with the CQ already contains an EQE for a completion event for that CQ. If the check at 412 is yes, no action is taken. If the check at 412 is no, such an EQE is added to the EQ at 414, and the program goes to FIG. 5.

A check is made at 416 to determine if a non-completion event is recognized for a QP or CQ resource. If the check at 416 is no, no action is taken. If the check at 416 is yes, a check is made at 418 to determine if the EQ associated with the resource already contains an EQE for a non-completion event for the QP or CQ resource. If the check at 418 is yes, no action is taken. If the check at 418 is no, such an EQE is added to the EQ at 420. The program then goes to FIG. 5.

FIG. 5 illustrates a program for giving the Adapter-Summary Indication and starts at 500. A check is made at 502 to determine if an ASB is associated with the EQ. If the check at 502 is yes, the ASB is set to a non-zero value at 504. A check is made at 506 to determine if a PSB is associated with the EQ. If yes, the PSB associated with the EQ is set to a non-zero value at 508. The program then goes to FIG. 6.

FIG. 6 illustrates an Adapter Interruption and starts at 600. A check is made at 602 to determine if the EQ was empty of EQEs for completion events when the EQE was recorded. If the check at 602 is yes, a check is made at 604 to determine if the EQ controls specify immediate interruption. If the check at 604 is no, no adapter interruption is made pending and the HCA continues at 612. If at 602 the EQ was not empty of EQEs for completion events when the EQE was recorded, an adapter interruption may or may not be made pending based on the state of the interruption delay timer as determined at 608. If the interrupt timer at 608 is not ready for an interrupt, the HCA continues at 612. The adapter interruption is made pending at 610 if the check at 608 indicates the interrupt timer time is ready for an interrupt. If at 602 the EQ was empty of EQEs for completion events when the EQE was recorded and at 604 the EQ controls specify immediate interruption, at 610 an adapter interruption request is signaled and made pending on the Izone and ISC associated with the EQ. The HCA then continues at 612.

It will be understood that when an adapter interruption is recognized or while the program has initiative, the program may use the associated ASBs to determine which EQs contain EQEs that need to be processed. This may result in no new work when the interruption is presented, but this is expected.

InfiniBand Host Channel Adapter Interruptions for Pageable Virtual Machines will now be described. Returning to FIG. 2, adapter interruptions for pageable virtual machines make use of the TYPE-1 EQ 206*a* and the TYPE-2 EQ 206*b*. A TYPE-1 EQ 206*a* is allocated by a host program (in host storage) on behalf of one or more guests for the notification to such guests of completion and non-completion events associated with guest CQs 204. A TYPE-1 EQ 206*a* is used by the machine to forward EQEs 207, recorded by the HCA 120, to the respective guest EQ 206. If a guest ASB 208 is associated with a guest EQ 206, the machine sets the ASB 208 when an EQE 207 is forwarded from the TYPE-1 EQ 206*a* to the guest EQ 206.

A TYPE-2 EQ 206*a* is allocated by a host program (in host storage) on behalf of one more guests for the notification of non-completion events not associated with guest CQs 204. Whenever the HCA 120 records an EQE 207 in a TYPE-2 EQ 206*b*, an adapter interruption is made immediately pending on the Izone and ISC associated with the EQ 206. When the adapter interruption is recognized, the host is responsible for processing the EQEs 207 in the TYPE-2 EQ 206*b*. This processing may include forwarding an EQE 207 to the guest EQ 206. As previously explained, the Izone identifies which logical partition is to receive the interruption, and the ISC defines interruption priority.

Figure 7:
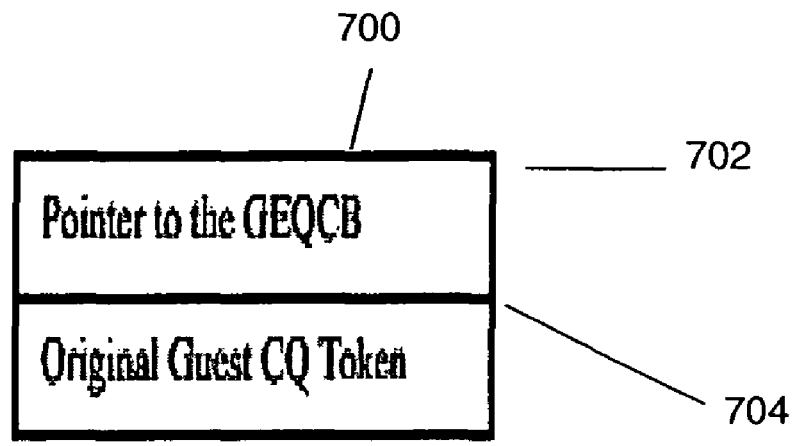
FIG. 7 is an illustration of the host structure of a Guest Event Queue Associator (GEQA)
Figure 8:
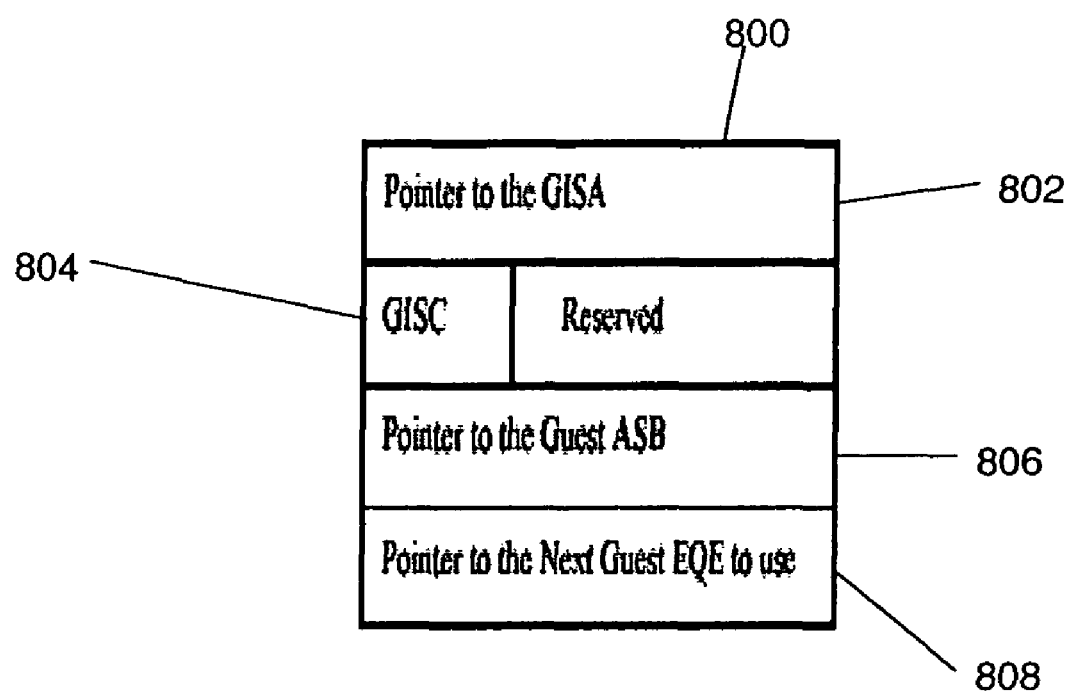
FIG. 8 is an illustration of the host structure of a Guest Event Queue Control Block (GEQCB)
Figure 9:
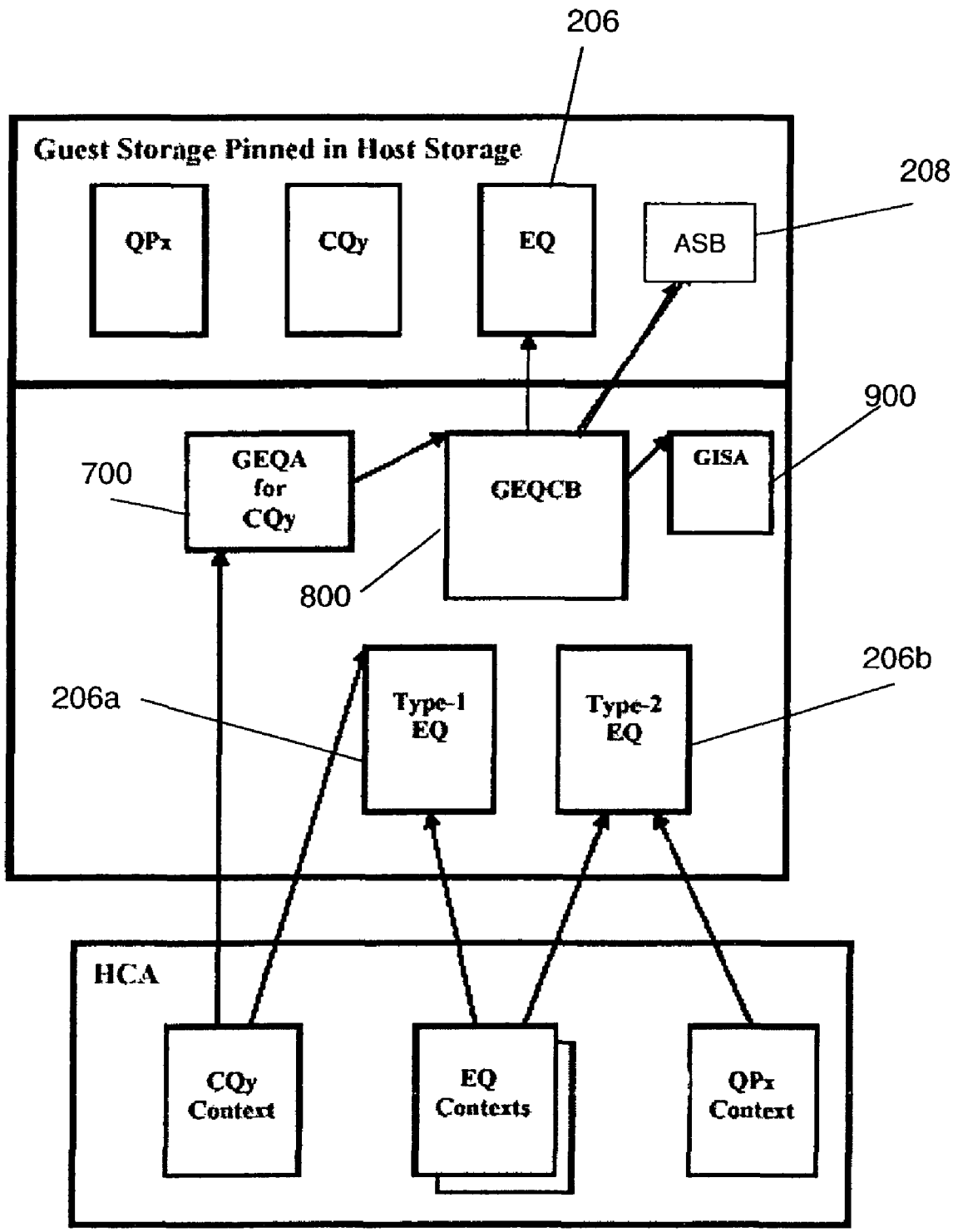
FIG. 9 illustrates the relationships of the GEQA, the GEQCB, and the guest and host HCA resources.

FIGS. 7 and 8 illustrated two host structures for associating a guest CQ 204 context with the guest EQ 206 and guest ASB 208 that are in guest storage and with the Guest Interruption State Area (GISA) 900 that is in host storage (see FIG. 9). FIG. 7 illustrates the Guest EQ Associator (GEQA) 700, and FIG. 8 illustrates the Guest EQ Control Block (GEQCB) 800. The GEQA 700 includes a pointer 702 to the GEQCB 800 and an original guest CQ token 704. The GEQCB 800 includes a pointer 802 to the GISA, the GISC 804, a pointer 806 to the guest ASB, and a pointer 808 to the next guest EQE to use. The relationships of the GEQA, the GEQCB, and the guest and host HCA resources are shown in FIG. 9.

How the relationships of FIG. 9 are allocated and constructed and Resource Allocation and Structure Initialization will now be described. When a guest issues the ALLOCATE instruction to allocate an HCA resource, the instruction intercepts to the host. This allows the host to pin the guest resource in host storage and to setup additional associations between adapter resource contexts, host structures, and the TYPE-1 EQ 206*a* and TYPE-2 EQ 206*b* as described below.

Figure 10:
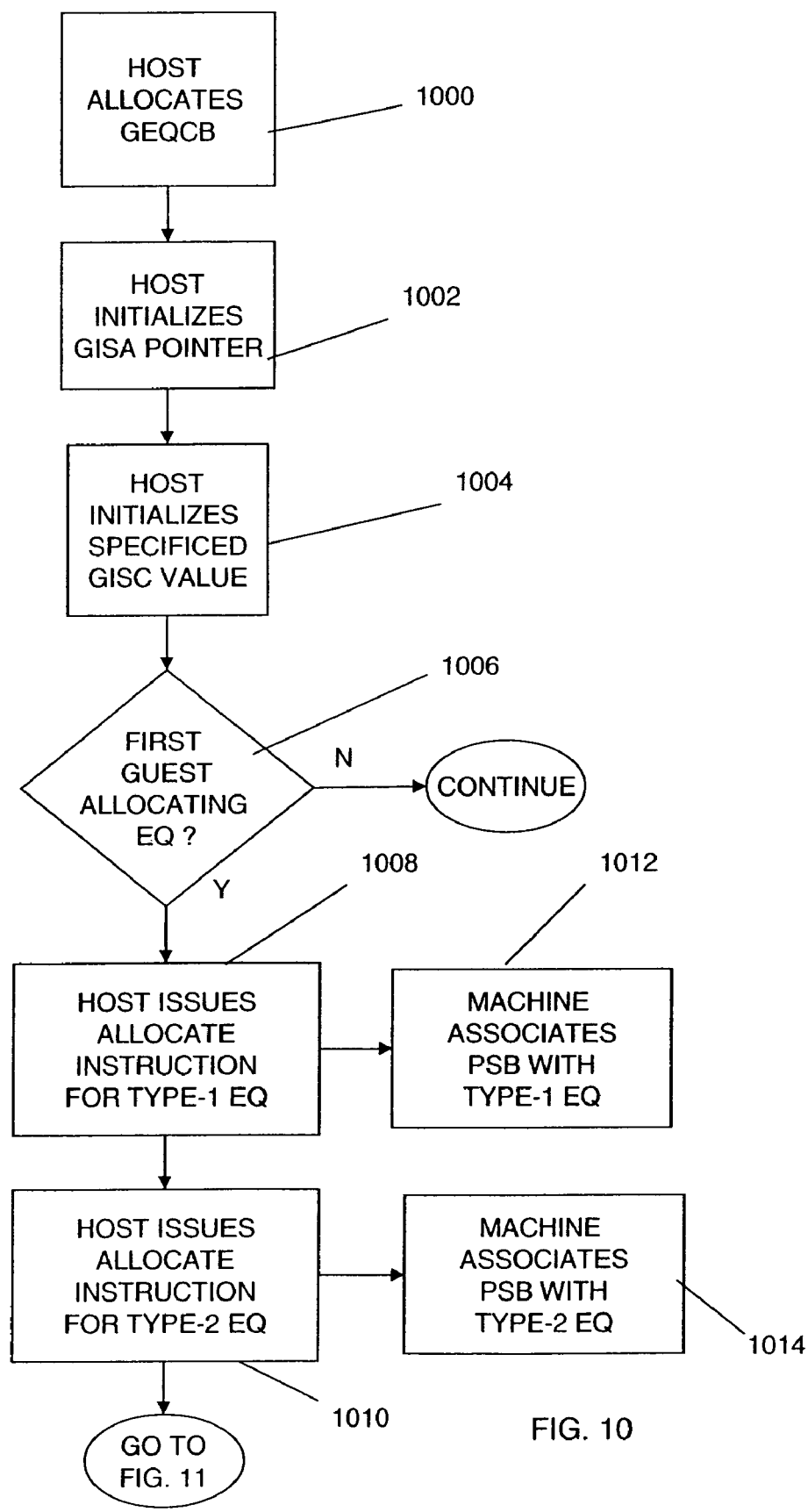
Figure 11:
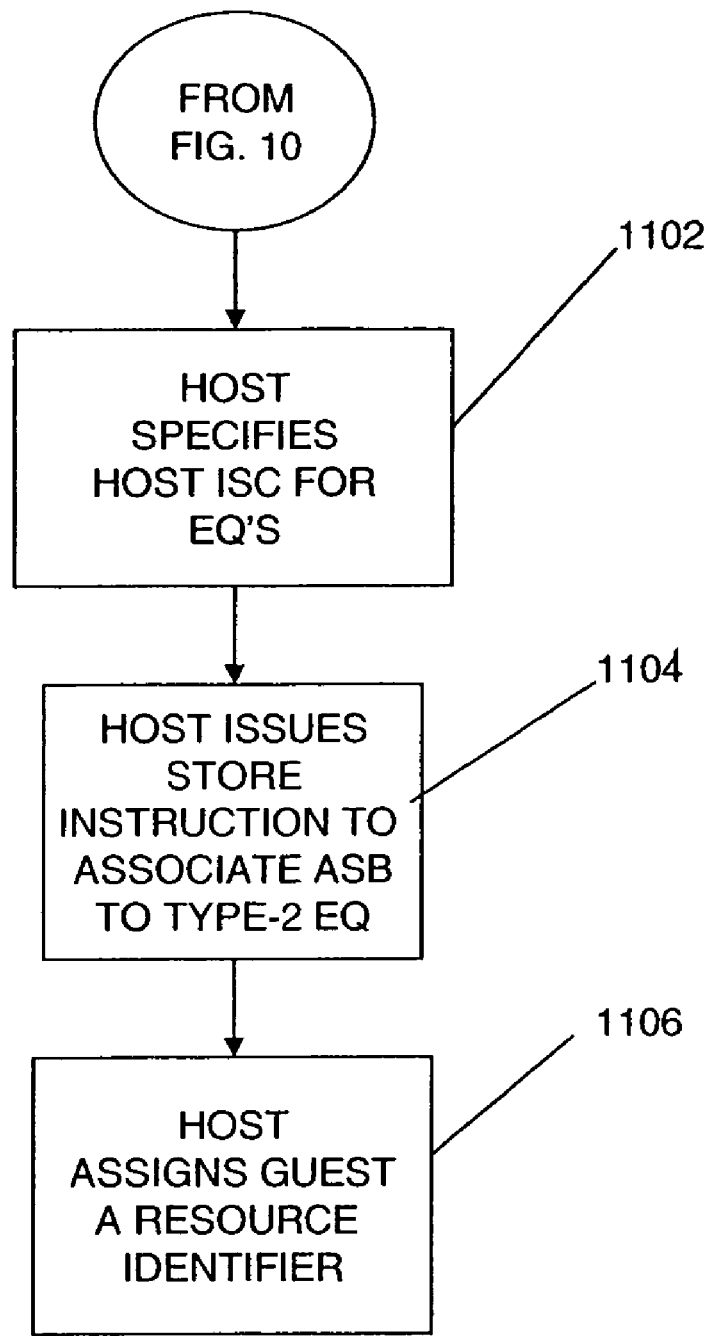

FIGS. 10 and 11 taken together, form a flowchart of functions performed by the host. When a guest ALLOCATE instruction designating an EQ allocation is intercepted, the host performs the following tasks as part of simulating the guest ALLOCATE starting at 1100. At 1000, the host allocates a GEQCB 800, at 1002 initializes the GISA pointer 802 to point to the GISA 900 for the guest, and at 1004 initializes the specified GISC value 804 from the value originally specified by the guest. A check is made at 1006 to determine if the guest is the first guest allocating an EQ for the specified adapter. If the check at 1006 is yes, the host issues ALLOCATE twice to allocate the TYPE-1 EQ 206*a* at 1008 and TYPE-2 EQ 206*b* for the adapter at 1010. At 1102 of FIG. 11, the host also specifies the host ISC for these EQs and at 1104 issues a STORE instruction to associate a unique host ASB 208 with the TYPE-2 EQ 206*b*. (No host ASB is associated with the TYPE-1 EQ.) When the host issues ALLOCATE to allocate the TYPE-1 EQ at 1008, the machine at 1012 associates a unique PSB 210 with the TYPE-1 EQ 206*a*. When the host issues ALLOCATE to allocate the TYPE-2 EQ at 1010, the machine at 1014 associates a single PSB 210 that is common to all TYPE-2 EQs with the TYPE-2 EQ 206*b*. At 1106, the host assigns the guest a resource identifier value for the guest EQ 206 that is greater than any identifier value implemented in the HCA 120. This will ensure that future STORE and LOAD instructions executed by the guest that designate the EQ 206 will intercept to the host.

Figure 12:
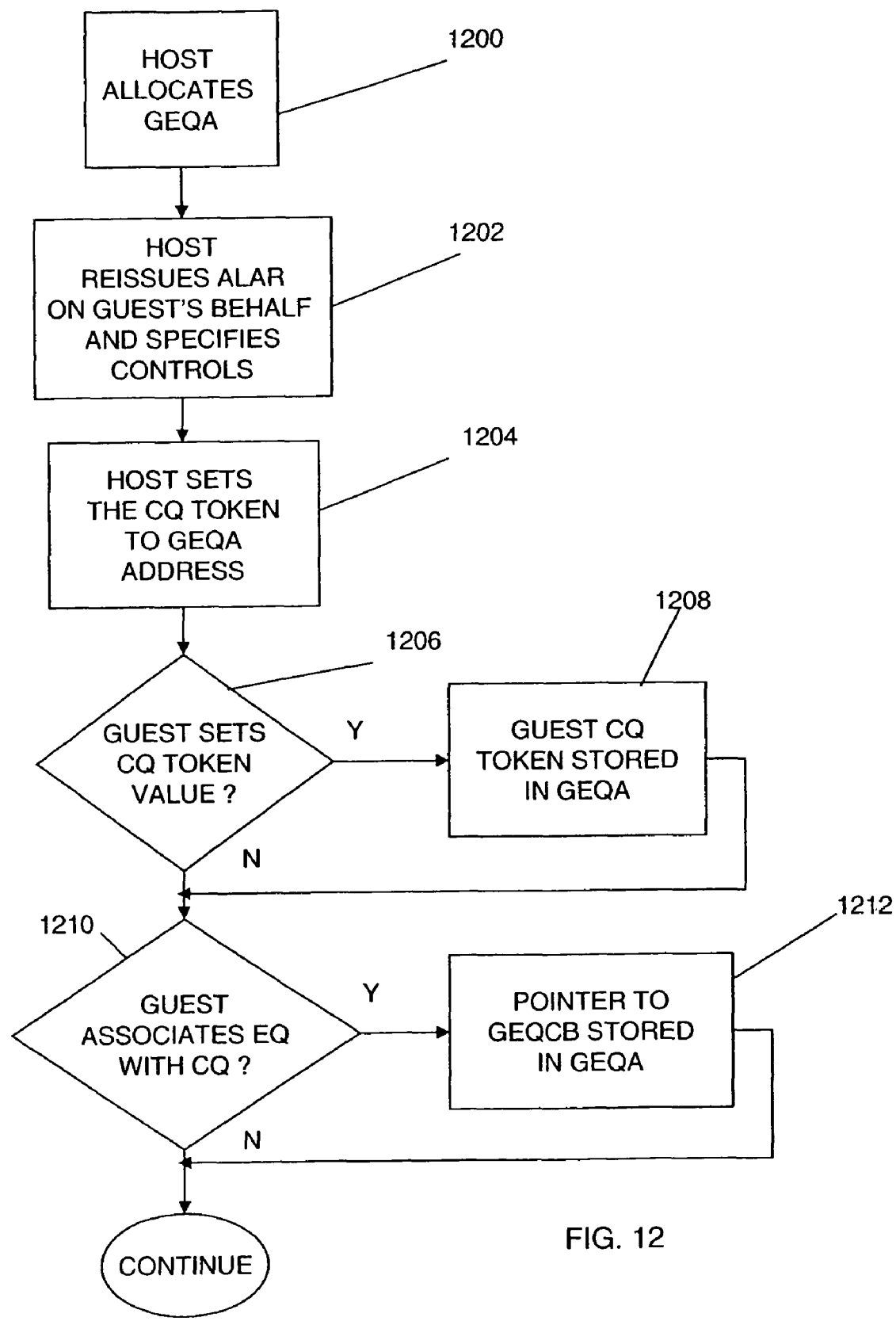

FIG. 12 forms a flowchart of a program which, when a guest ALLOCATE instruction designating a CQ allocation is intercepted, the host performs the function of FIG. 12 as part of simulating the guest ALLOCATE. At 1200, the host allocates a GEQA. At 1202, the host reissues the ALLOCATE on behalf of the guest and specifies the interpretive execution controls that cause interception of guest STORE and LOAD instructions that specify the real-storage-area type. At 1204, the host issues a STORE instruction to set the CQ token to the address of the GEQA for the CQ. A check is made at 1206 to determine when the guest issues a STORE instruction to set the CQ token value. If yes, the instruction is intercepted at 1208 and the guest CQ token value 702 is stored in the GEQA 700. A check is made at 1210 to determine when the guest issues a STORE instruction to associate the EQ with the CQ. If yes, the instruction is intercepted at 1212 and the pointer to the GEQCB for the EQ 702 is stored in the GEQA 700.

FIG. 13 is a flowchart for providing a function which, when the guest issues the STORE instruction to associate an ASB with its EQ, the instruction is intercepted and the host pins the page containing the guest ASB at 1300, and at 1302, places the host address of the ASB 208 in the GEQCB 800 at 804.

FIG. 14 is a flowchart for providing a function which, when a guest ALLOCATE instruction designating a QP allocation is intercepted, the host reissues the ALLOCATE at 1400 on behalf of the guest and specifies the interpretive execution controls that cause interception of guest store and load instructions that specify the real-storage-area type.

FIG. 15 is a flowchart for providing a function which, when the guest issues STORE to associate an EQ with the QP, the instruction is intercepted and the host reissues the STORE on behalf of the guest specifying the association of the TYPE-2 EQ 206 for the adapter to the guest QP 202. Host Channel Adapter Event Notification for Pageable Virtual Machines will now be described. Host channel adapter interruptions for pageable virtual machines are best understood in the context of the sequence of events comprising guest HCA event notification.

Figure 16:
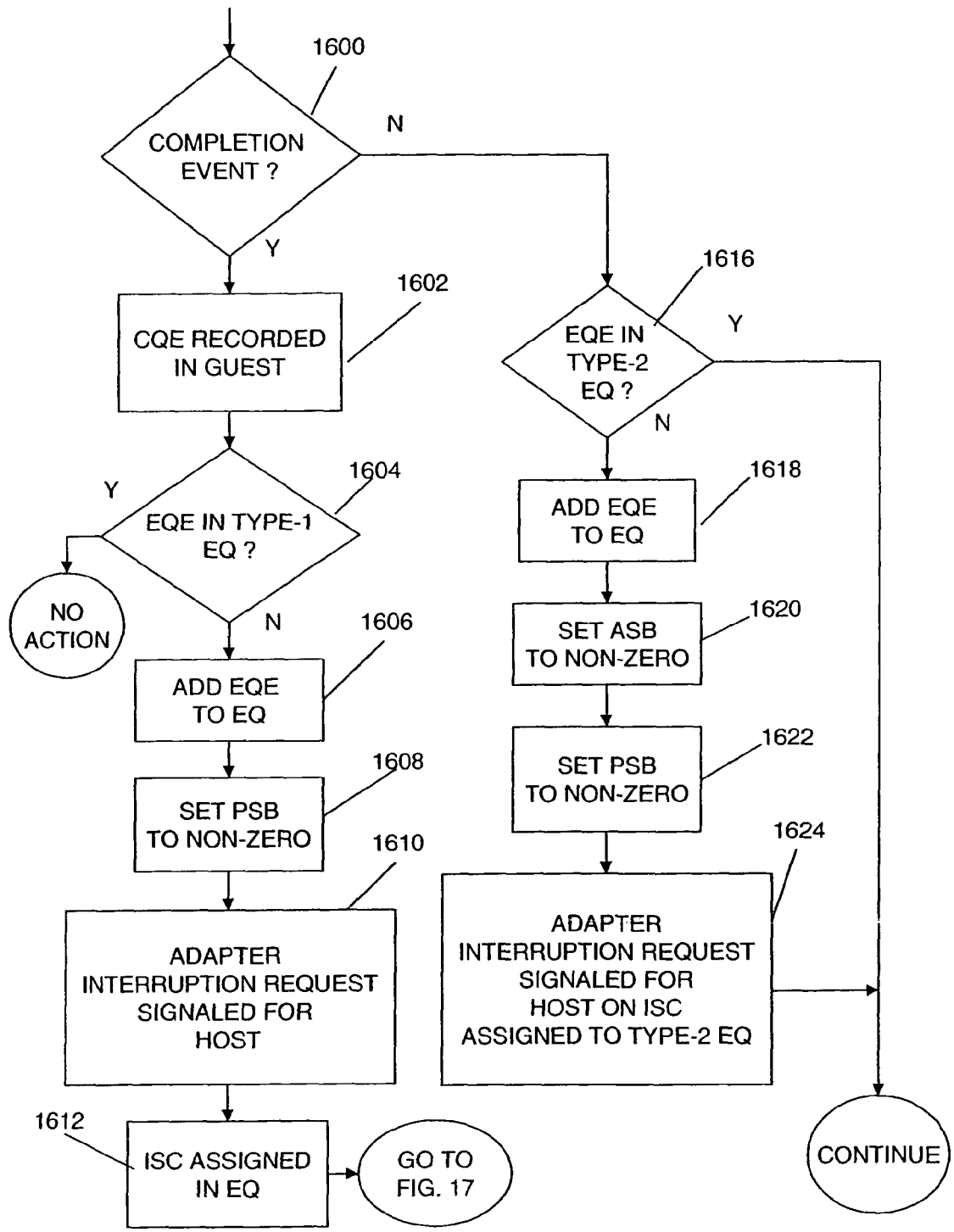
FIGS. 16 and 17, when taken together, form a flowchart for functions for Host Channel Adapter Event Notification for pageable virtual machines.

FIG. 16 forms a flowchart for virtual machine (i.e. guest) HCA event notification for a logical partition. At 1600, the HCA performs a check to determine when a completion event is recognized by an HCA. If the check at 1600 is yes, at 1602 a CQE 205 is recorded in the guest (send or receive) CQ 204 associated with the guest QP 202 containing the work request.

A check is made at 1604 to determine if the TYPE-1 EQ 206a associated with the CQ 204 already contains an EQE 207 for a completion event for that CQ. If yes at 1604, no further action is taken by the HCA. If the check at 1604 is no, at 1606 an EQE 207 is added to the TYPE-1 EQ 206a. At 1608, the associated PSB is set to a non-zero value. It 1610, and adapter interruption request is signaled for the host, and at 1612, the ISC is assigned in the EQ. The HAS then goes to FIG. 17.

If the check at 1600 is no, a check is made at 1616 to determine when the TYPE-2 EQ 206a associated with the resource already contains an EQE 207 for a non-completion event for the QP 202 or CQ 204 resource. If the check at 1616 is yes, no further action is taken by the HCA. If the check at 1616 is no, at 1618 an EQE 207 is added to the EQ 206.

If an EQE 207 for a non-completion event was added at 1628 to the TYPE-2 EQ 206b, at 1620 the ASB 208 associated with the EQ 206 is set to a non-zero value. (TYPE-1 EQs have no associated ASB.) When an EQE 207 is added to a TYPE-2 EQ 206b, the associated PSB is set to a non-zero value at 1622 and goes to FIG. 17.

Host Adapter Interruptions will now be discussed. If an EQE 207 was added to a TYPE-1 EQ 206a, an adapter interruption request is signaled for the host at 1610, and ISC assigned to the EQ 206 at 1612 and the HCA goes to FIG. 17. When an EQE 207 was added to a TYPE-2 EQ 206b at 1618, an interruption request is signaled and is made pending on the host ISC assigned to the TYPE-2 EQ 206b at 1624 and the HCA continues.

Figure 17:
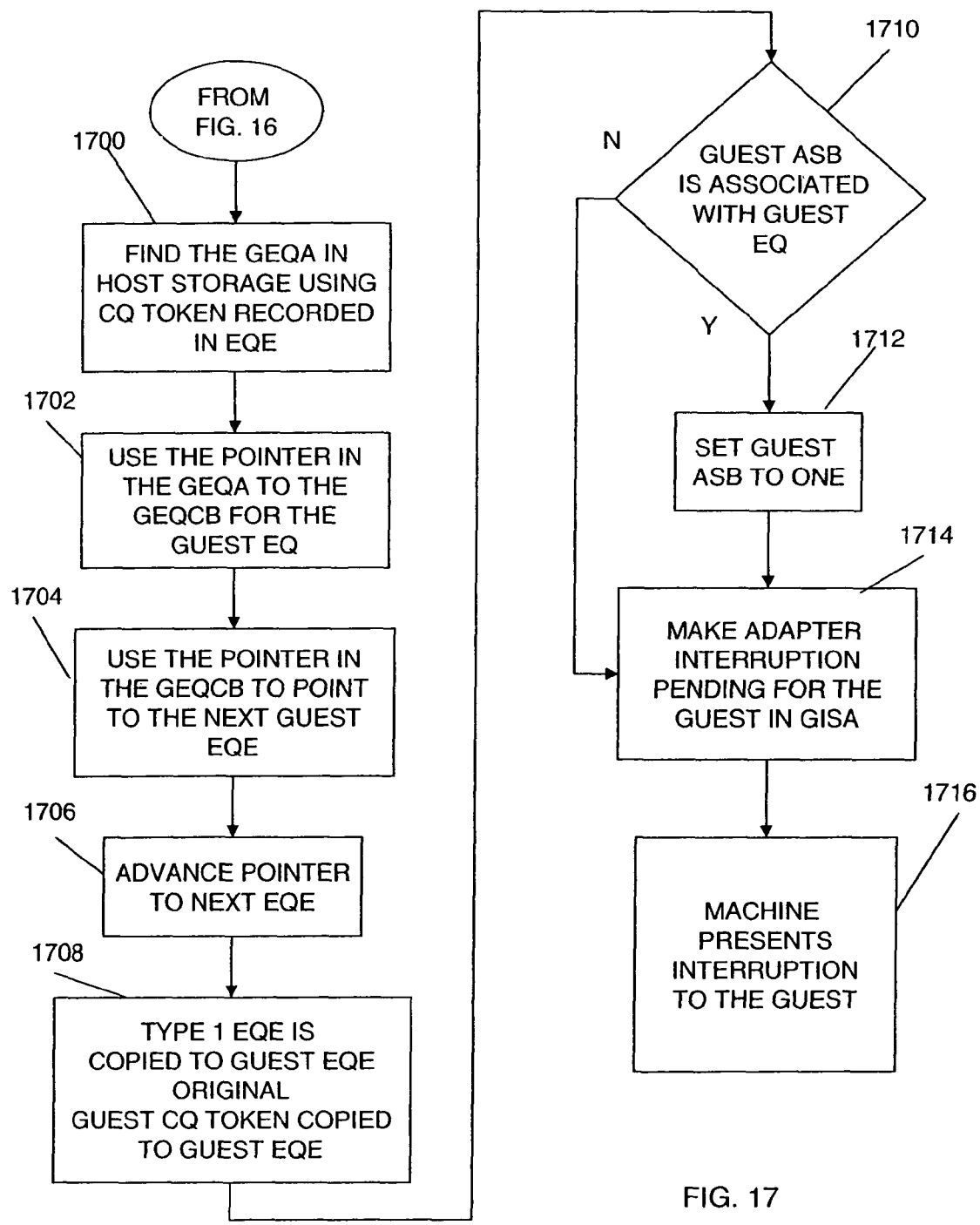

FIG. 17 forms a flowchart for additional actions performed by the machine for completion events from FIG. 16. Guest Adapter-Event Description Recording is as follows. Using the next EQE 207 in the TYPE-1 EQ 206a, the EQ 206 is forwarded to (recorded in) the guest EQ 206. At 1700, the CQ token 704 that was recorded in the EQE 207 is the address of the GEQA 700 in host storage. At 1702, the GEQA 700 contains the pointer to the GEQCB 702 for the guest EQ 206. At 1704, the GEQCB 800 includes a pointer to the next guest EQE to use 808. The value of this pointer is retained and the pointer is advanced to point to the next EQE 207 in order to prevent other CPUs from simultaneously using the same EQE. At 1708, the TYPE-1 EQE 206a is copied to the guest EQE 207 and the original guest CQ token value 704 in the GEQA 700 is copied to the CQ token field 704 in the guest EQE 207.

Guest Adapter-Summary Indication recording will now be discussed. A check is made at 1710 to determine if a guest ASB is associated with the guest EQ. If the check at 1710 is yes, (the pointer to the guest ASB 806 in the GEQCB 800 is not zero), the guest ASB is set to a non-zero value at 1712.

Guest Adapter Interruption will now be discussed. At 1714, an adapter interruption is made pending for the guest in the GISA 900 shown in FIG. 9 for the guest as identified by the GISA pointer 802 in the GEQCB 800. This is done by setting the guest interruption subclass (GISC) bit in the GISA 900 that corresponds to the GISC associated with the guest EQ 206. After the interruption has been made pending in the GISA 900, it will be presented at 1716 to the guest, by the machine, per guest I/O and interruption subclass enablement. If the corresponding alerting mask bit in the GISA is one, an alerting interruption is made to the host.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of providing for two levels of server virtualization comprising:
   providing a first level of virtualization by means of a first hypervisor enabling multiple logical partitions to share a set of resources of a server;
   providing a second level of virtualization by means of a second hypervisor enabling multiple, independent virtual machines to share said resources that are assigned to a single logical partition;
   grouping all events for all of the virtual machines within said single logical partition into a single partition-owned event queue for receiving event notifications from the shared resources for that single logical partition; and
   signaling the second hypervisor by generating an interrupt for the grouped events from the partition-owned event queue, the interrupt for demultiplexing grouped events from the partition-owned event queue into individual, virtualized event queues that are allocated on a per virtual machine basis.

2. The method according to claim 1 further comprising:
   grouping events in said partition-owned event queue into completion events and non-completion events.

3. The method according to claim 2 further comprising:
   associating events in said partition-owned event queue with an adapter summary byte stored in said logical partition.

4. The method according to claim 2 further comprising:
   associating events in said partition-owned event queue with a unique primary summary byte stored in a hardware storage area of main memory of said server.

5. The method according to claim 3 further comprising:
   forwarding an entry in the partition-owned event queue to a guest owning the event;
   setting the associated adapter summary byte of said guest subsequent to said adapter summary byte having been associated with said guest; and
   making a guest adapter interruption pending in response to determining that said guest is configured to receive an interruption.

6. A system computer providing for two levels of server virtualization comprising:
   a first hypervisor providing a first level of virtualization enabling multiple logical partitions to share a set of resources;

a second hypervisor providing a second level of virtualization enabling multiple, independent virtual machines to share said resources that are assigned to a single logical partition;

a single partition-owned event queue within a single logical partition for grouping all events for all of the virtual machines within said single logical partition for receiving event notifications from the shared resources for that single logical partition; and an interrupt signal generator, the interrupt signal generator for signaling the second hypervisor by generating an interrupt for the grouped events from the partition-owned event queue, the interrupt for demultiplexing grouped events from the partition-owned event queue into individual, virtualized event queues that are allocated on a per virtual machine basis.

7. The system according to claim 6 further comprising:
completion and non-completion queues in said partition-owned event queue for grouping events into completion events and non-completion events.

8. The system according to claim 7 further comprising:
an adapter summary byte stored in said logical partition associated with events in said partition-owned event queue.

9. The system according to claim 7 further comprising:
a unique primary summary byte stored in a hardware storage area of main memory of said server associated with events in said partition-owned event queue.

10. The system according to claim 8 further comprising:
a forwarding function responsive to said interruption for forwarding an entry in the partition-owned event queue to a guest owning the event;
a setting function setting the associated adapter summary byte of said guest subsequent to said adapter summary byte having been associated with said guest; and
an interruption function making a guest adapter interruption pending in response to determining that said guest is configured to receive an interruption.

11. A program product for providing for two levels of server virtualization, said program product comprising:
a computer storage having recorded thereon computer readable program code performing the method comprising:
providing a first level of virtualization by means of a first hypervisor enabling multiple logical partitions to share a set of resources of a server;
providing a second level of virtualization by means of a second hypervisor enabling multiple, independent virtual machines to share said resources that are assigned to a single logical partition;
grouping all events for all of the virtual machines within said single logical partition into a single partition-owned event queue for receiving event notifications from the shared resources for that single logical partition; and
signaling the second hypervisor by generating an interrupt for the grouped events from the partition-owned event queue, the interrupt for demultiplexing grouped events from the partition-owned event queue into individual, virtualized event queues that are allocated on a per virtual machine basis.

12. The program product according to claim 11 wherein said method further comprises:
grouping events in said partition-owned event queue into completion events and non-completion events.

13. The program product according to claim 12 wherein said method further comprises:
associating events in said partition-owned event queue with an adapter summary byte stored in said logical partition.

14. The program product according to claim 12 wherein said method further comprises:
associating events in said partition-owned event queue with a unique primary summary byte stored in a hardware storage area of main memory of said server.

15. The program product according to claim 13 wherein said method further comprises:
responsive to said interruption, forwarding an entry in the partition-owned event queue to a guest owning the event;
setting the associated adapter summary byte of said guest subsequent to said adapter summary byte having been associated with said guest; and
making a guest adapter interruption pending in response to determining that said guest is configured to receive an interruption.

16. A computer storage having instructions stored as a computer readable data structure executable by a processor the computer readable data structure comprising:
multiple logical partitions established by a first hypervisor providing a first level of virtualization, said multiple logical partitions for sharing a set of resources of a server;
multiple, independent virtual machines assigned to a single logical partition by a second hypervisor providing a second level of virtualization, said virtual machines for sharing said set of resources; and
a single partition-owned event queue for receiving event notifications from the shared resources for that single logical partition thereby grouping all events for all of the virtual machines within said single logical partition, receiving an interrupt for the grouped events from the partition-owned event queue, and demultiplexing grouped events from the partition-owned event queue into individual, virtualized event queues that are allocated on a per virtual machine basis, in response to receiving the interrupt.

17. The computer storage according to claim 16 wherein said partition-owned event queue is divided into a first type queue for completion events and a second type queue for non-completion events.

18. The computer storage according to claim 17 further comprising:
an adapter summary byte stored in said logical partition, said adapter summary byte associated with events in said partition-owned event queue.

19. The computer storage according to claim 16 further comprising:
a unique primary summary byte stored in a hardware storage area of main memory of said server, said primary summary byte associated with events in said partition-owned event queue.

20. The computer storage according to claim 18 further comprising:
an entry in the partition-owned event queue of a guest owning the event, the entry forwarded to said guest responsive to receiving said interrupt;
the associated adapter summary byte of said guest being set subsequent to said adapter summary byte having been associated with said guest.

* * * * *